US008461986B2

(12) United States Patent
Snyder

(10) Patent No.: US 8,461,986 B2
(45) Date of Patent: Jun. 11, 2013

(54) AUDIBLE EVENT DETECTOR AND ANALYZER FOR ANNUNCIATING TO THE HEARING IMPAIRED

(76) Inventor: Wayne Harvey Snyder, Simi Valley, CA (US)

( * ) Notice: Subject to any disclaimer, the term of this patent is extended or adjusted under 35 U.S.C. 154(b) by 1170 days.

(21) Appl. No.: 12/276,824

(22) Filed: Nov. 24, 2008

(65) Prior Publication Data

US 2009/0154744 A1 Jun. 18, 2009

Related U.S. Application Data

(60) Provisional application No. 61/014,013, filed on Dec. 14, 2007.

(51) Int. Cl.

*G08B 21/00* (2006.01)
*G09B 21/00* (2006.01)
*G10L 21/06* (2006.01)
*H04R 25/00* (2006.01)

(52) U.S. Cl.

USPC ............ 340/540; 340/4.1; 381/313; 381/315; 434/112; 704/271

(58) Field of Classification Search

USPC .................. 340/540, 4.1–4.14, 407.1–407.2, 340/FOR. 418; 434/112, 114; 704/271–276; 381/313–316, 320, FOR. 112; 382/190–191; 367/116

See application file for complete search history.

(56) References Cited

U.S. PATENT DOCUMENTS 4,212,085 A * 7/1980 Vaillancour et al. .......... 367/124
4,227,055 A * 10/1980 Hanson .......................... 702/70
4,450,436 A * 5/1984 Massa .......................... 340/531
4,573,187 A * 2/1986 Bui et al. ...................... 704/275
4,625,206 A * 11/1986 Jensen .......................... 340/902
4,691,358 A * 9/1987 Bradford ........................ 381/12
4,806,931 A * 2/1989 Nelson .......................... 340/907
4,864,297 A * 9/1989 Shaw et al. .................... 340/902
4,952,931 A * 8/1990 Serageldin et al. ........... 340/902
5,095,467 A * 3/1992 Olson et al. ................... 367/125
5,495,242 A * 2/1996 Kick et al. ..................... 340/902
5,563,849 A * 10/1996 Hall et al. ..................... 367/127
5,831,936 A * 11/1998 Zlotnick et al. ............... 367/124
5,848,171 A * 12/1998 Stockham et al. ............ 381/321
5,894,279 A * 4/1999 Rose et al. .................... 340/902
6,070,140 A * 5/2000 Tran ............................. 704/275
6,119,087 A 9/2000 Kuhn
6,173,074 B1 1/2001 Russo (Continued)

OTHER PUBLICATIONS

O. K. Ersoy, M. Zeng, D. Zimmerman, B, Ferguson, "Non-Linear Matched Filtering and Neural Networks"; p. 1067-1070; Purdue University, School of Electrical Engineering, W, Lafayette, IN 47907; ISCAS'88 copyright IEEE 1988.*

(Continued)

*Primary Examiner* — Steven Lim
*Assistant Examiner* — Stephen Burgdorf
(74) *Attorney, Agent, or Firm* — Paul D. Chancellor; Ocean Law

(57) ABSTRACT

An electronic device for analyzing signal content derived from audible events, the device aiding the hearing impaired by annunciating events of interest including dangerous events. The device detects the presence of an event of interest by comparing characteristics of detected acoustic events with pre-determined reference characteristics, provides non-audible annunciators to indicate the presence of an event of interest, the type of event, and the direction from which the event is detected.

12 Claims, 4 Drawing Sheets

U.S. PATENT DOCUMENTS

| | | | | |
|---|---|---|---|---|
| 6,219,643 | B1 | 4/2001 | Cohen | |
| 6,240,392 | B1 | 5/2001 | Butnaru | |
| 6,469,732 | B1 * | 10/2002 | Chang et al. | 348/14.08 |
| 6,751,580 | B1 * | 6/2004 | Cope et al. | 703/2 |
| 6,826,284 | B1 * | 11/2004 | Benesty et al. | 381/92 |
| 6,975,991 | B2 * | 12/2005 | Basson et al. | 704/271 |
| 6,980,152 | B2 * | 12/2005 | Steadman et al. | 342/14 |
| 6,999,923 | B1 * | 2/2006 | Ablondi et al. | 704/231 |
| 7,053,780 | B1 * | 5/2006 | Straub et al. | 340/601 |
| 7,054,452 | B2 * | 5/2006 | Ukita | 381/92 |
| 7,277,116 | B1 * | 10/2007 | Messina | 348/14.08 |
| 7,386,141 | B2 * | 6/2008 | Beimel et al. | 381/313 |
| 7,388,512 | B1 * | 6/2008 | Moorer, Jr. | 340/850 |
| 7,787,876 | B1 * | 8/2010 | Fessler et al. | 455/423 |
| 7,791,499 | B2 * | 9/2010 | Mohan et al. | 340/902 |
| 7,953,228 | B2 * | 5/2011 | Faltesek et al. | 381/56 |
| 7,957,967 | B2 * | 6/2011 | Zakarauskas | 704/233 |
| 8,331,591 | B2 * | 12/2012 | Fischer et al. | 381/313 |
| 2002/0150263 | A1 * | 10/2002 | Rajan | 381/92 |
| 2002/0190861 | A1 * | 12/2002 | Wentworth | 340/568.1 |
| 2003/0004729 | A1 * | 1/2003 | Allen et al. | 704/275 |
| 2006/0017561 | A1 * | 1/2006 | Albert | 340/531 |
| 2006/0149552 | A1 | 7/2006 | Bogdanov | |
| 2010/0226210 | A1 * | 9/2010 | Kordis et al. | 367/127 |

OTHER PUBLICATIONS

Neng-Tsann Ueng, Louis Scharf; "Frames and Orthonormal Bases for Viariable Windowed Fourier Transforms"; pp. 2494-2497; Dept. of Electrical and Computer Engineering, University of Colorado, Boulder, CO 80309; copyright IEEE 1996.*

* cited by examiner

AUDIBLE EVENT DETECTOR AND ANALYZER FOR ANNUNCIATING TO THE HEARING IMPAIRED

PRIORITY CLAIM AND INCORPORATION BY REFERENCE

This patent application claims the benefit of U.S. Prov. Pat. App. No. 61/014,013 filed Dec. 14, 2007.

U.S. Pat. Nos. 6,240,392, 6,219,643, 6,173,074, and 6,119,087 are incorporated herein by reference. U.S. Pat. App. No. 60/091,047 and U.S. Pat. Pub. No. 2006-0149552 A1 are incorporated herein by reference.

BACKGROUND OF THE INVENTION

Field of the Invention

The present invention relates to an electronic device utilizing one or more of signal analysis and signal filters for aiding the hearing impaired.

SUMMARY OF THE INVENTION

In the present invention an acoustically triggered non-audible annunciator for the hearing impaired comprises an intermediate block in signal communication with each of an acoustic to electric device and a non-audible annunciator. A first electrical signal is produced by the acoustic to electric device in response to an acoustic emission from an acoustic source. A second electrical signal is derived from the first electrical signal and the second electrical signal is indicative of at least a portion of the frequency content of the first signal. In various embodiments, in a plurality of reference bands, each reference frequency band is indicative of the nature of at least one acoustic source and there is a means for comparing the second electrical signal to each of the reference frequency bands. In some embodiments the intermediate block causes operation of the non-audible annunciator when a reference frequency band bears a pre-determined relationship to the frequency content of the first signal.

In an embodiment, a sound triangulator utilizes signals from a plurality of acoustic to electric devices to obtain an indication of a relative position of an acoustic source whose acoustic emission caused operation of a non-audible annunciator.

In an embodiment operation of a first annunciator alerts a hearing impaired person to assess the status of a second annunciator indicating the nature of the acoustic source and a third annunciator indication the direction of the acoustic source.

In an embodiment the assessor element includes a plurality of analog band-pass filters each band pass filter coupled to the electrical output of the acoustic to electric device.

In an embodiment the comparison element includes a plurality of analog comparators, each comparator coupled to a) an output of a respecitive band pass filter for receiving a signal in a pre-determined frequency band, b) a respective reference source for receiving a reference characteristic and c) a particular non-audible annunciator for operating the annunciator.

In an embodiment each of the band pass filters is tuned to a different frequency band and a respective reference characteristic is a pre-determined signal strength.

In an embodiment the assessor element and the comparison element include one or more digital signal processors coupled to a) the electrical output of the acoustic to electric device, b) a plurality of reference sources for receiving a plurality of reference characteristics, and c) a plurality of non-audible annunciators for operating one or more of the annunciators.

In an embodiment a signal from the output of the acoustic to electric device is transformed into the frequency domain to provide a derived acoustic signature of the acoustic source.

In an embodiment an annunciator is operated when the derived acoustic signature bears a pre-determined relationship with a reference acoustic signature.

In an embodiment a reference characteristic is a frequency band and frequency peaks in the derived acoustic signature falling within the reference frequency band cause operation of a particular non-audible annunciator.

And, in an embodiment a digital signal processor is used in deriving the acoustic signature from the output of the acoustic to electric device.

BRIEF DESCRIPTION OF THE DRAWINGS

The present invention is described with reference to the accompanying figures. These figures, incorporated herein and forming part of the specification, illustrate the present invention and, together with the description, further serve to explain the principles of the invention and to enable a person skilled in the relevant art to make and use the invention.

DETAILED DESCRIPTION OF THE PREFERRED EMBODIMENTS

Figure 1:
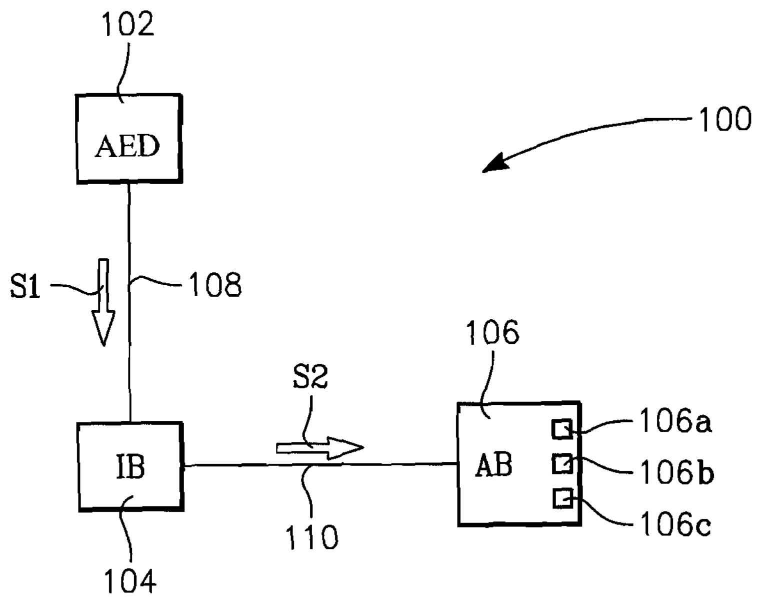
FIG. 1 is a block diagram of a device for the hearing impaired in accordance with the present invention.

FIG. 1 shows a block diagram 100 in accordance with present invention. An intermediate block 104 receives signals from an acoustic to electric device 102 and an annunciator block 106 receives signals from the intermediate block. One or a plurality of signal paths 108 interconnect the acoustic to electric device and one or a plurality of signal paths interconnect the intermediate block and the annunciator block. As those of ordinary skill in the art will recognize, the described signal paths may be one or more of electric conductors, optical conductors or another medium capable of propagating a signal such as an atmosphere useful for propagating ultrasonic signals or radio waves.

Figure 2:
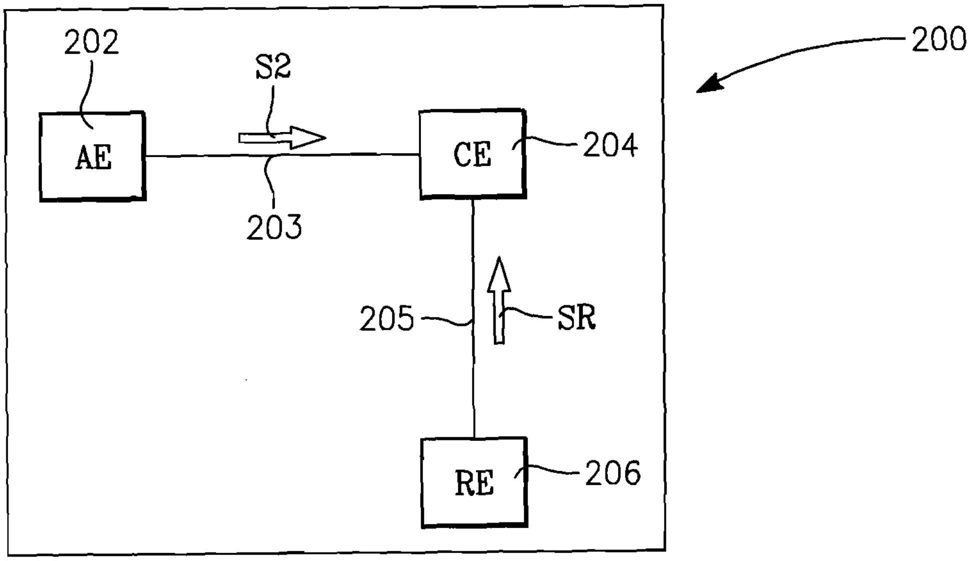
FIG. 2 is block diagram of an intermediate block of the device for the hearing impaired of FIG. 1.

The intermediate block 104 signals the annunciator block to operate one or more annunciators when the acoustic to electric device is excited by one or more particular acoustic sources 112. For example, FIG. 2 shows a block diagram 200 of an intermediate block. Included in this intermediate block are assessor 202, comparison 204 and reference 206 elements.

The assessor element 202 is operable to assess one or more characteristics of the electrical output of the acoustic to electric device (the "S1 signal"). In an embodiment, the assessor element assesses one or more characteristics of the electrical output of the acoustic to electric device in a particular frequency band, such as a pre-determined frequency band.

Figure 3:
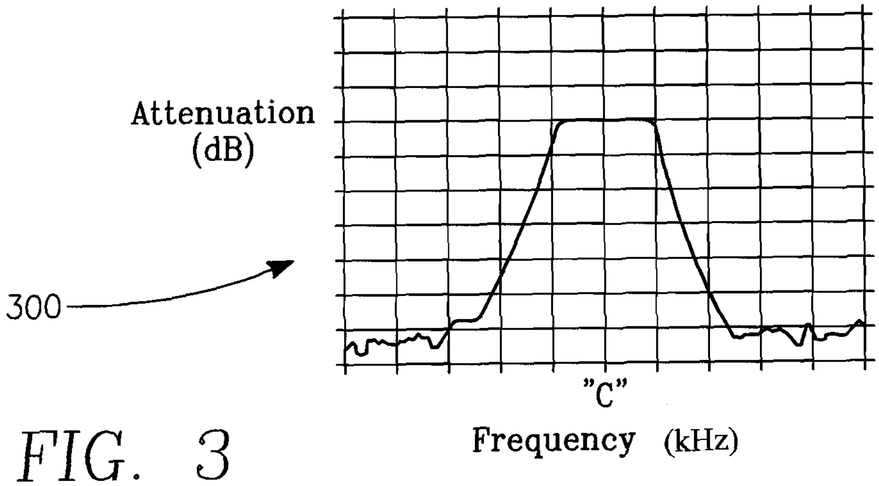
FIG. 3 is a diagram of a signal processed in a band pass filter of the device for the hearing impaired of FIG. 1.

In an embodiment, the assessor element 202 incorporates an analog filter such as a band pass filter for isolating particular content S2 of the signal S1. As shown in FIG. 3, the band pass filter attenuates the input signal outside a pass-band centered on a selected center frequency "C." In some embodiments, the assessor element incorporates multiple band-pass filters, each centered on a different frequency for assessing characteristics in a one of a plurality of frequency bands.

Capable of isolating multiple frequency peaks present in a signal, digital signal analyzers and/or filters may be used by the assessor element 202 to assess characteristics of signal S1. In an embodiment, the assessor element 202 incorporates spectral analysis such as Fourier Transform analysis for determining the particular frequency content S2 of the signal S1. The assessor element assesses characteristics in one or a plurality of frequency bands. In an embodiment, the assessor element 202 incorporates a digital filter such as a filter implementing a Fourier Transform.

Figure 4A:
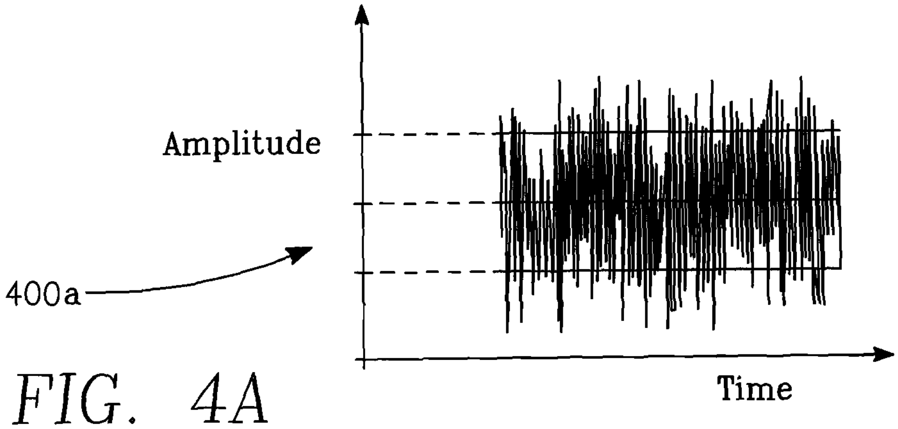
FIGS. 4A,B are diagrams indicative of an output signal of an acoustic to electric device of the device for the hearing impaired of FIG. 1.
Figure 4B:
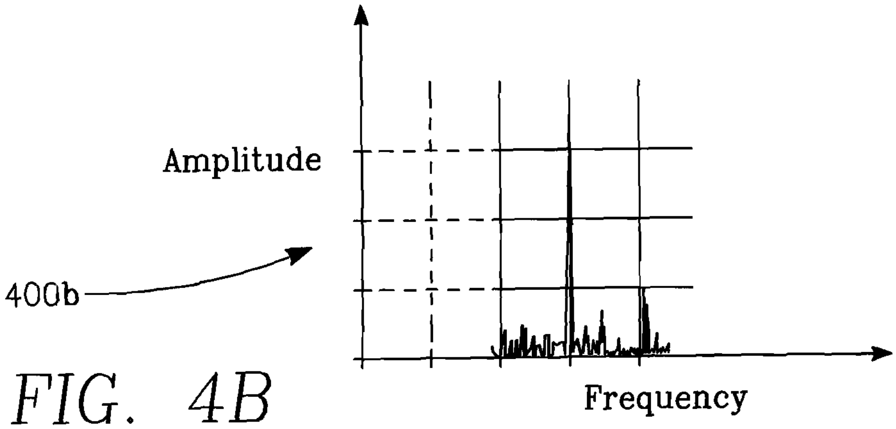

As shown in FIG. 4*a*, a time-domain signal plot 400*a*, the signal S1 may be a complex signal including many different frequency components. When this signal is processed by a Fourier Transform filter, the output appears as shown in the frequency-domain plot 400*b* of FIG. 4*b*; here, there are one or more peaks representing the frequencies at which the strongest signals occur. The signal peaks, such as voltage peaks, indicate the predominant frequencies present in the signal S1.

Figure 7:
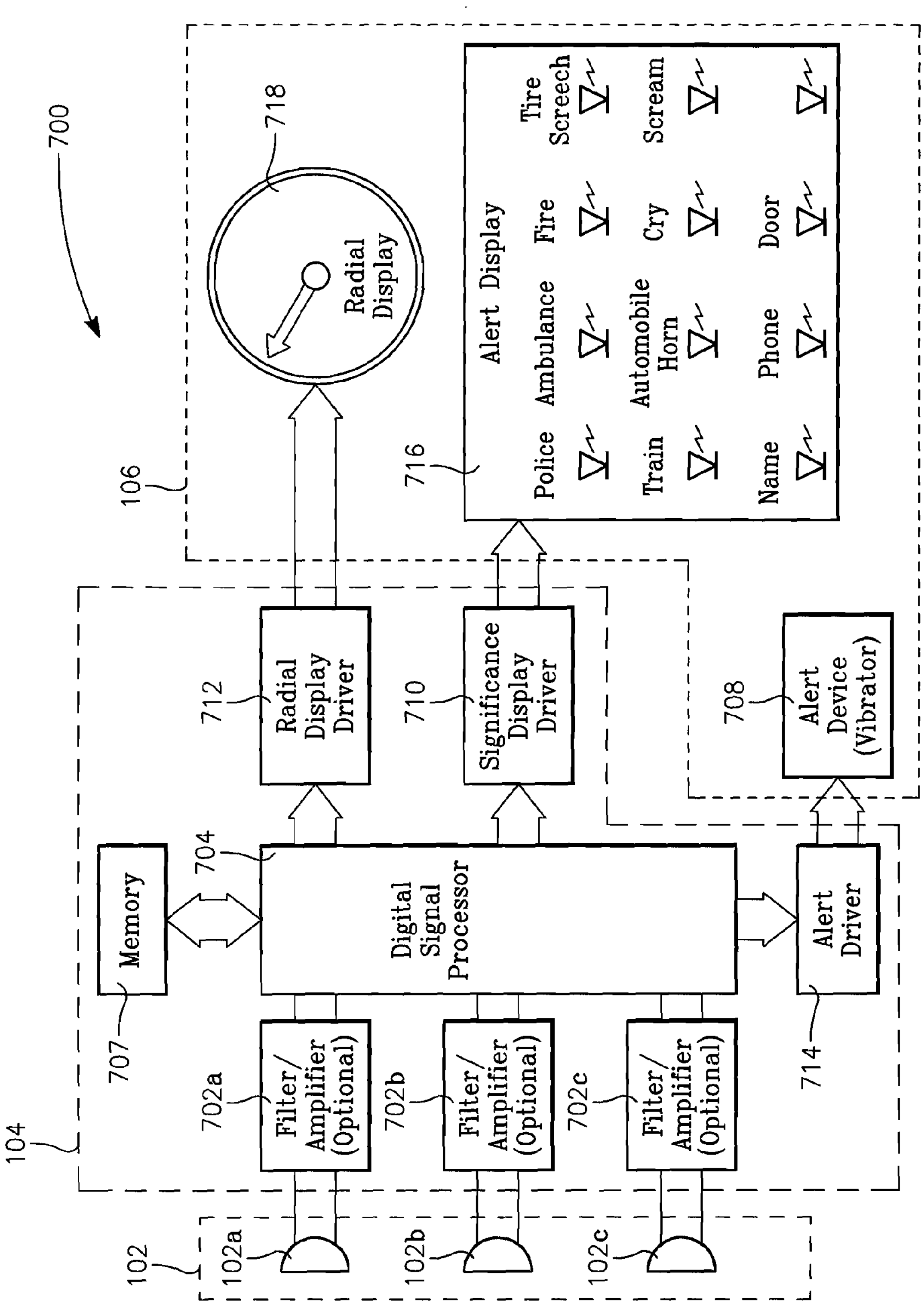
FIG. 7 is a block diagram of a multi-annunciator embodiment of the device for the hearing impaired of FIG. 1.

Still other devices may be used to enable the assessor element 202 to evaluate characteristics of the signal S1. For example, FIG. 7 shows an embodiment 700 of the present invention wherein a digital signal processor 704 receives signals from one or a plurality of acoustic to electric devices 102*a-c* via respective optional filter/amplifiers 702*a-c*. In this configuration, the DSP is used to evaluate characteristics of the signal S1. Digital signal processors useful for this purpose include general purpose DSP's and in particular, Texas Instrument's TMS320VC5507-200.

In an embodiment, the pre-determined frequency band is the frequency band audible to humans, including frequencies from about 20 Hz to 20,000 Hz. In other embodiments, the pre-determined frequency band is a smaller portion of this audible frequency band, such as a 450 Hz to 550 Hz band centered on a commonly used 500 Hz siren frequency.

Figure 5:
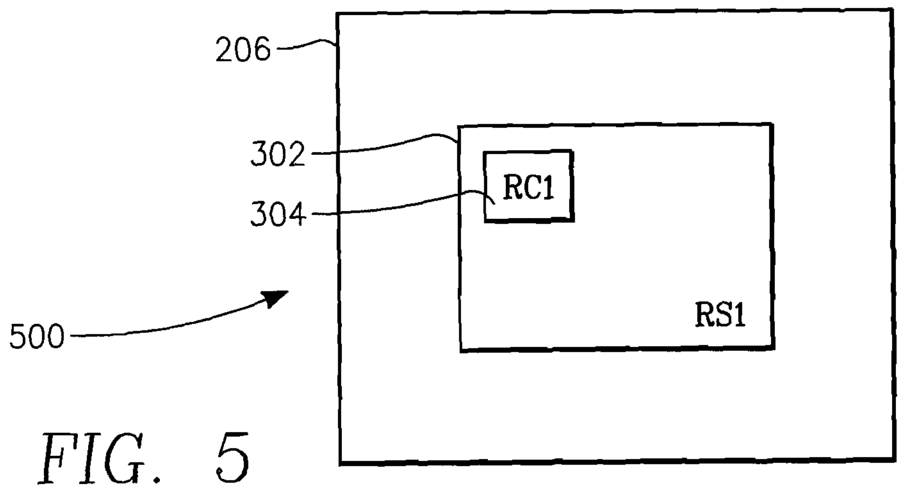
FIG. 5 is a block diagram of a reference element of the device for the hearing impaired of FIG. 1.

FIG. 5 shows a block diagram of a reference element 500. Here, a reference element 206 includes one or more reference sources 302 for providing respective reference characteristics 304, each reference characteristic being indicative of an audible event calling for an immediate action, such as an immediate human action. Reference characteristics include acoustic signatures for comparison with acoustic signatures isolated from signals received from acoustic to electric device(s) 102.

The reference element may be implemented in analog form, such as resistors of given values used to produce given voltages or currents as reference values, or in digital form such as in digital memory accessible to a digital processor. As shown in the embodiment of FIG. 7, a digital signal processor 704 receives the signal S1 to assess a particular characteristic of the signal. In an embodiment, the DSP is in communication with a digital memory device 707 in which one or a plurality reference values are stored.

Comparison of an output of the assessor element 202 with a respective reference characteristic 504 occurs in the comparison element 204. The comparison element is operable to cause operation of a particular one or combination of non-audible annunciators 106*a-c* when in the pre-determined frequency band at least one characteristic of the signal S1 bears a pre-determined relationship with a reference characteristic.

In an embodiment, the comparison element 204 compares the strength of an audio signal in the electric output of the acoustic to electric device with a reference signal strength. When the audio signal strength bears a pre-determined relationship with the reference signal strength, an element of the intermediate block such as the comparison element causes operation of a particular non-audible annunciator. In some embodiments, it is the audio signal in a particular frequency band that is compared with a reference signal strength. For example, in an embodiment the presence of a particular frequency component in the signal S1 causes operation of a particular annunciator when the energy at that frequency as indicated by voltage, amplitude or other indicia known to those of ordinary skill in the art exceeds a reference value. In other embodiments, one or more specific frequencies and/or amplitudes are compared with reference frequencies and/or amplitudes.

As persons of ordinary skill in the art will understand, an acoustic to electric device 102 having a digital output 108 may be used in the present invention. In this case, a digital interface of the intermediate block 104 will receive the signal, such as a digital interface of the assessor element 202.

Figure 6:
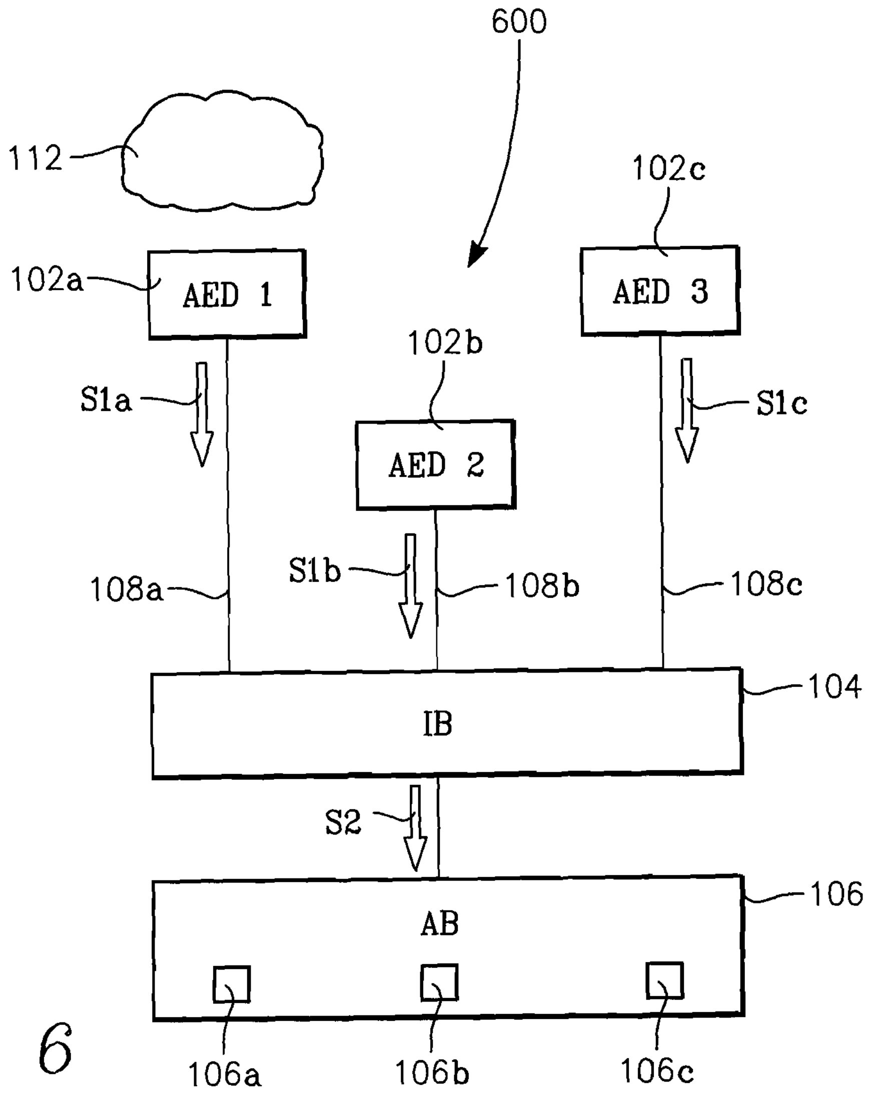
FIG. 6 is a block diagram of a multiple acoustic to electric device version of the device for the hearing impaired of FIG. 1.

In some embodiments, multiple acoustic to electric devices may be used to enable an indication of the position of an acoustic source 112 relative to one or more of the acoustic electric devices. For example, FIG. 6 shows an embodiment of the present invention having three acoustic to electric devices. Here, the acoustic to electric devices 102*a-c* are spaced apart and respective output signals S1*a-c* are responses to an acoustic emission 112. A plurality of audio signals, in this case three, provides information about the location of the audio source relative to the acoustic to electric devices. Using three spaced apart acoustic to electric devices allows the direction and/or location of the acoustic emission relative to the acoustic electric devices to be approximated based on an estimated value of the speed of sound used in the following three equations: $t1=d1/v$, $t2=d2/v$ and $t3=d3/v$. In each equation, the distance (d1, d2, d3) can be determined since the respective times (t1, t2, t3) and velocity are known. Assuming the acoustic to electric devices and the acoustic source lie in the same plane, there is a single point can be identified where circles of diameters d1, d2 and d3 with centers at the locations of the respective acoustic to electric devices have a common intersecting point. Moreover, even if multiple planes are involved, so long as the separation between the planes is small compared to the distance between the acoustic to electric devices and the acoustic source, a good approximation of the direction and distance is nevertheless obtained.

In various embodiments, the triangulation methods disclosed in one or more of U.S. Pat. Nos. 7,054,228 and 7,277,116 may be used alone or in conjunction with the methods described above. In an embodiment, a fourth acoustic to electric device such as a microphone (not shown) is used to enable identification of an acoustic source location in three dimensions. Here, one of the triangulation methods described above may be extended for this purpose or another methodology known in the art such as that of the Appendix to this application may be used for this purpose.

Referring again to FIGS. 1 and 6, an annunciator block 106 receives signals S2 from the intermediate block 104. In an embodiment, one of a plurality of non-audible annunciators

106*a-c* is operated by the intermediate block in response to an audible event calling for an immediate action, such as an immediate human action.

Referring again to FIG. 7, this embodiment shows a plurality of intermediate block drivers 710, 712, 714 for causing operation of respective annunciators 708, 716, 718 within an annunciator block 106 in response to signals from a digital signal processor 704. A driver such as an alert driver 714 operates a tactile exciter such as a vibrator or a vibrating alert device 708. In an embodiment, a tactile exciter serves to get a person's attention, causing the person to examine other information made available by the present invention. A driver such as a radial display driver 712 operates a direction indicating display such as a radial display 718. In some embodiments, the radial display includes an alphanumeric display. As was discussed above, some embodiments include direction and distance sensing features which is displayed in various embodiments on a radial display and/or a conventional alphanumeric display.

A driver such as a significance display driver 710 operates a selected one or more of a plurality of illuminating devices such as lamps or light emitting diodes 716. As was discussed above, various characteristics of a signal S1 can be obtained by analyzing the signal and a subsequent comparison of the signal characteristic with a reference value used for operating an annunciator indicating for example the occurrence of a particular event or the proximity of a particular acoustic source such as traffic, train, horn, voice, tire squeal, alarm, siren, panic noise and the like. Exemplary luminary annunciators include annunciators for police, ambulance, fire, tire screech, train, automobile horn, cry, scream, name, phone and door or door bell. For example, a signal S1 containing a peak at 500 Hz in the frequency domain may be indicative of a police siren and if so, would in an embodiment cause the operation of the police luminary annunciator of the annuniciator 716.

In operation, one or a plurality of characteristics are searched for in the signal S1. For example, multiple band pass filters may be used or a Fourier Transform may be implemented in a digital filter of the intermediate block 104. In an embodiment, a broad spectrum filter or no filter (the alert filter) is used merely to sense the occurrence of a loud noise. In addition, in a similar manner and/or as described above, characteristics of the signal such as signal component amplitudes at frequencies of interest are determined. In some embodiments multiple acoustic to electric devices 102*a-c* are used to provide a relative direction and distance to the acoustic source.

When the signal from the alert filter exceeds a respective reference value 304, the tactile exciter is operated to get the attention of a person using the present invention. The attending person then looks at one or more of a radial display and a panel of luminary annunciators 716 to determine the relative location and the nature of the of the acoustic emission. In this manner, users of the present invention are provided with notice and/or warning of proximate acoustic events.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

The invention claimed is:

1. A warning device for the hearing impaired comprising:

an acoustic to electric device having an electrical output responding to an acoustic emission from an acoustic source;

a first signal path coupling the acoustic to electric device with an intermediate block;

one or more second signal paths coupling respective non-audible annunciators with the intermediate block;

within the intermediate block, an assessor element operable to assess one or more characteristics of the electrical output of the acoustic to electric device in a pre-determined frequency band;

within the intermediate block, a reference element including one or more reference sources for providing respective reference characteristics, each reference characteristic indicative of an audible event calling for immediate action;

within the intermediate block, a comparison element operable to cause operation of a particular non-audible annunciator when in the pre-determined frequency band at least one characteristic of the electrical output of the acoustic to electric device bears a pre-determined relationship with a reference characteristic;

the comparison element capable of comparing the strength of a recognized or an unrecognized audio signal in the electric output of the acoustic to electric device with a reference signal strength and causing operation of a particular non-audible annunciator when the audio signal strength bears a pre-determined relationship with the reference signal strength;

the comparison element capable of comparing the strength of an audio signal in a selected frequency band in the electric output of the acoustic to electric device with a reference signal strength and causing operation of a particular non-audible annunciator when the audio signal strength bears a pre-determined relationship with the reference signal strength;

first, second and third acoustic to electric devices having a pre-determined spatial arrangement relative to each other;

a sound triangulator utilizing signals from a plurality of the first, second and third acoustic to electric devices to obtain distance and direction to an acoustic source whose acoustic emission caused operation of a particular non-audible annunciator;

a radial display for pointing in the direction of the acoustic source;

wherein operation of a first annunciator alerts a hearing impaired person to assess the status of a second annunciator indicating the nature of the acoustic source and a third annunciator indicating the direction of the acoustic source; and, wherein the assessor element includes a plurality of analog band-pass filters; each band pass filter coupled to the electrical output of an acoustic to electric device.

2. The device of claim 1 wherein the comparison element includes a plurality of analog comparators, each comparator coupled to a) an output of a respective band pass filter for receiving a signal in a pre-determined frequency band, b) a respective reference source for receiving a reference characteristic and c) a particular non-audible annunciator for operating the particular annunciator.

3. The device of claim 2 wherein each of the band pass filters is tuned to a different frequency band and a respective reference characteristic is a pre-determined signal strength.

4. A warning device for the hearing impaired comprising:

an acoustic to electric device having an electrical output responding to an acoustic emission from an acoustic source;

a first signal path coupling the acoustic to electric device with an intermediate block;

one or more second signal paths coupling respective non-audible annunciators with the intermediate block;

within the intermediate block, an assessor element operable to assess one or more characteristics of the electrical output of the acoustic to electric device in a pre-determined frequency band;

within the intermediate block, a reference element including one or more reference sources for providing respective reference characteristics, each reference characteristic indicative of an audible event calling for immediate action;

within the intermediate block, a comparison element operable to cause operation of a particular non-audible annunciator when in the pre-determined frequency band at least one characteristic of the electrical output of the acoustic to electric device bears a pre-determined relationship with a reference characteristic;

the comparison element capable of comparing the strength of a recognized or an unrecognized audio signal in the electric output of the acoustic to electric device with a reference signal strength and causing operation of a particular non-audible annunciator when the audio signal strength bears a pre-determined relationship with the reference signal strength;

the comparison element capable of comparing the strength of an audio signal in a selected frequency band in the electric output of the acoustic to electric device with a reference signal strength and causing operation of a particular non-audible annunciator when the audio signal strength bears a pre-determined relationship with the reference signal strength;

first, second and third acoustic to electric devices having a pre-determined spatial arrangement relative to each other;

a sound triangulator utilizing signals from a plurality of the first, second and third acoustic to electric devices to obtain distance and direction to an acoustic source whose acoustic emission caused operation of a particular non-audible annunciator;

a radial display for pointing in the direction of the acoustic source;

wherein operation of a first annunciator alerts a hearing impaired person to assess the status of a second annunciator indicating the nature of the acoustic source and a third annunciator indicating the direction of the acoustic source;

wherein a signal from an electrical output of the acoustic to electric device is transformed into the frequency domain to provide a derived acoustic signature of the acoustic source; and, wherein a particular annunciator is operated when the derived acoustic signature bears a pre-determined relationship with a reference acoustic signature.

5. A warning device for the hearing impaired comprising:

an acoustic to electric device having an electrical output responding to an acoustic emission from an acoustic source;

a first signal path coupling the acoustic to electric device with an intermediate block;

one or more second signal paths coupling respective non-audible annunciators with the intermediate block;

within the intermediate block, an assessor element operable to assess one or more characteristics of the electrical output of the acoustic to electric device in a pre-determined frequency band;

within the intermediate block, a reference element including one or more reference sources for providing respective reference characteristics, each reference characteristic indicative of an audible event calling for immediate action;

within the intermediate block, a comparison element operable to cause operation of a particular non-audible annunciator when in the pre-determined frequency band at least one characteristic of the electrical output of the acoustic to electric device bears a pre-determined relationship with a reference characteristic;

the comparison element capable of comparing the strength of a recognized or an unrecognized audio signal in the electric output of the acoustic to electric device with a reference signal strength and causing operation of a particular non-audible annunciator when the audio signal strength bears a pre-determined relationship with the reference signal strength;

the comparison element capable of comparing the strength of an audio signal in a selected frequency band in the electric output of the acoustic to electric device with a reference signal strength and causing operation of a particular non-audible annunciator when the audio signal strength bears a pre-determined relationship with the reference signal strength;

first, second and third acoustic to electric devices having a pre-determined spatial arrangement relative to each other;

a sound triangulator utilizing signals from a plurality of the first, second and third acoustic to electric devices to obtain distance and direction to an acoustic source whose acoustic emission caused operation of a particular non-audible annunciator;

a radial display for pointing in the direction of the acoustic source;

wherein operation of a first annunciator alerts a hearing impaired person to assess the status of a second annunciator indicating the nature of the acoustic source and a third annunciator indicating the direction of the acoustic source;

wherein a signal from the electrical output of an acoustic to electric device is transformed into the frequency domain to provide a derived acoustic signature of the acoustic source; and, wherein a reference characteristic is a frequency band and frequency peaks in the derived acoustic signature falling within the reference frequency band cause operation of a particular non-audible annunciator.

6. The device of claim 5 wherein a digital signal processor is used in deriving the derived acoustic signature from the electrical output of an acoustic to electric device.

7. A method for the hearing impaired comprising the steps of:

providing an acoustic to electric device having an electrical output responding to an acoustic emission from an acoustic source;

providing a first signal path coupling the acoustic to electric device with an intermediate block;

providing one or more second signal paths coupling respective non-audible annunciators with the intermediate block;

within the intermediate block, assessing with an assessor element one or more characteristics of the electrical output of the acoustic to electric device in a pre-determined frequency band;

within the intermediate block, providing a reference element including one or more reference sources having respective reference characteristics, each reference characteristic indicative of an audible event calling for immediate action;

within the intermediate block, providing a comparison element operating a particular non-audible annunciator when in the pre-determined frequency band at least one characteristic of the electrical output of the acoustic to electric device bears a pre-determined relationship with a reference characteristic;

wherein the comparison element compares the strength of a recognized or an unrecognized audio signal in the electric output of the acoustic to electric device with a reference signal strength;

causing operation of a particular non-audible annunciator when the audio signal strength bears a pre-determined relationship with the reference signal strength;

wherein the comparison element compares the strength of an audio signal in a selected frequency band in the electric output of the acoustic to electric device with a reference signal strength;

causing operation of a particular non-audible annunciator when the audio signal strength bears a pre-determined relationship with the reference signal strength;

providing at least first, second and third acoustic to electric devices;

arranging the at least first, second and third acoustic to electric devices to have a pre-determined spatial arrangement relative to each other;

providing a sound triangulator;

utilizing signals from a plurality of the at least first, second and third acoustic to electric devices to obtain distance and direction to an acoustic source whose acoustic emission caused operation of a particular non-audible annunciator;

providing a radial display;

operating the radial display such that it points in the direction of the acoustic source;

operating a first annunciator to alert a hearing impaired person to assess the status of a second annunciator; the second annunciator indicating the nature of the acoustic source;

operating a third annunciator indicating the direction of the acoustic source;

including a plurality of analog band-pass filters in the assessor element; and, coupling an electrical output of an acoustic to electric device to each band pass filter.

8. The method of claim 7 further comprising the steps of:

including a plurality of analog comparators in the comparison element;

coupling each analog comparator to an output of a respective band pass filter for receiving a signal in a pre-determined frequency band;

coupling each analog comparator to a respective reference source for receiving a reference characteristic; and, coupling each analog comparator to a particular non-audible annunciator for operating the particular non-audible annunciator.

9. The method of claim 8 further comprising the steps of:

tuning each band pass filter to a different frequency band; and, providing a respective reference characteristic that is a pre-determined signal strength.

10. A method for the hearing impaired comprising the steps of:

providing an acoustic to electric device having an electrical output responding to an acoustic emission from an acoustic source;

providing a first signal path coupling the acoustic to electric device with an intermediate block;

providing one or more second signal paths coupling respective non-audible annunciators with the intermediate block;

within the intermediate block, assessing with an assessor element one or more characteristics of the electrical output of the acoustic to electric device in a pre-determined frequency band;

within the intermediate block, providing a reference element including one or more reference sources having respective reference characteristics, each reference characteristic indicative of an audible event calling for immediate action;

within the intermediate block, providing a comparison element operating a particular non-audible annunciator when in the pre-determined frequency band at least one characteristic of the electrical output of the acoustic to electric device bears a pre-determined relationship with a reference characteristic;

wherein the comparison element compares the strength of a recognized or an unrecognized audio signal in the electric output of the acoustic to electric device with a reference signal strength;

causing operation of a particular non-audible annunciator when the audio signal strength bears a pre-determined relationship with the reference signal strength;

wherein the comparison element compares the strength of an audio signal in a selected frequency band in the electric output of the acoustic to electric device with a reference signal strength;

causing operation of a particular non-audible annunciator when the audio signal strength bears a pre-determined relationship with the reference signal strength;

providing at least first, second and third acoustic to electric devices;

arranging the at least first, second and third acoustic to electric devices to have a pre-determined spatial arrangement relative to each other;

providing a sound triangulator;

utilizing signals from a plurality of the at least first, second and third acoustic to electric devices to obtain distance and direction to an acoustic source whose acoustic emission caused operation of a particular non-audible annunciator;

providing a radial display;

operating the radial display such that it points in the direction of the acoustic source;

operating a first annunciator to alert a hearing impaired person to assess the status of a second annunciator; the second annunciator indicating the nature of the acoustic source;

operating a third annunciator indicating the direction of the acoustic source;

transforming a signal from the electrical output of an acoustic to electric device into the frequency domain;

using the transformed signal as a derived acoustic signature of the acoustic source; and, operating a particular annunciator when the derived acoustic signature bears a pre-determined relationship with a reference acoustic signature.

11. A method for the hearing impaired comprising the steps of:

providing an acoustic to electric device having an electrical output responding to an acoustic emission from an acoustic source;

providing a first signal path coupling the acoustic to electric device with an intermediate block;

providing one or more second signal paths coupling respective non-audible annunciators with the intermediate block;

within the intermediate block, assessing with an assessor element one or more characteristics of the electrical output of the acoustic to electric device in a pre-determined frequency band;

within the intermediate block, providing a reference element including one or more reference sources having respective reference characteristics, each reference characteristic indicative of an audible event calling for immediate action;

within the intermediate block, providing a comparison element operating a particular non-audible annunciator when in the pre-determined frequency band at least one characteristic of the electrical output of the acoustic to electric device bears a pre-determined relationship with a reference characteristic;

wherein the comparison element compares the strength of a recognized or an unrecognized audio signal in the electric output of the acoustic to electric device with a reference signal strength;

causing operation of a particular non-audible annunciator when the audio signal strength bears a pre-determined relationship with the reference signal strength;

wherein the comparison element compares the strength of an audio signal in a selected frequency band in the electric output of the acoustic to electric device with a reference signal strength;

causing operation of a particular non-audible annunciator when the audio signal strength bears a pre-determined relationship with the reference signal strength;

providing at least first, second and third acoustic to electric devices;

arranging the at least first, second and third acoustic to electric devices to have a pre-determined spatial arrangement relative to each other;

providing a sound triangulator;

utilizing signals from a plurality of the at least first, second and third acoustic to electric devices to obtain distance and direction to an acoustic source whose acoustic emission caused operation of a particular non-audible annunciator;

providing a radial display;

operating the radial display such that it points in the direction of the acoustic source;

operating a first annunciator to alert a hearing impaired person to assess the status of a second annunciator; the second annunciator indicating the nature of the acoustic source;

operating a third annunciator indicating the direction of the acoustic source;

transforming a signal from the electrical output of an acoustic to electric device into the frequency domain;

using the transformed signal as a derived acoustic signature of the acoustic source.

providing a reference characteristic that is a reference frequency band; and, operating a particular non-audible annunciator when frequency peaks in the derived acoustic signature fall within the reference frequency band.

12. The method of claim 11 further comprising the step of using a digital signal processor to derive the derived acoustic signature from the electrical output of an acoustic to electric device.

* * * * *